(12) United States Patent
Li et al.

(10) Patent No.: US 10,088,876 B1
(45) Date of Patent: Oct. 2, 2018

(54) MOUNTING APPARATUS FOR HARD DISK DRIVE AND ELECTRONIC DEVICE USING THE SAME

(71) Applicant: HONGFUJIN PRECISION ELECTRONICS (TIANJIN) CO.,LTD., Tianjin (CN)

(72) Inventors: Han-Yu Li, New Taipei (TW); Wen-Hu Lu, Tianjin (CN); Cheng-He Li, Tianjin (CN); Ya-Ni Zhang, Tianjin (CN); Gong-Wen Zhang, Tianjin (CN)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 9 days.

(21) Appl. No.: 15/598,405

(22) Filed: May 18, 2017

(30) Foreign Application Priority Data

Mar. 28, 2017 (CN) .......................... 2017 1 0193955

(51) Int. Cl.
*G06F 1/18* (2006.01)
(52) U.S. Cl.
CPC .................................. *G06F 1/181* (2013.01)

(58) Field of Classification Search
CPC ........... G06F 1/181; G06F 1/187; G11B 5/82; G11B 23/505
USPC .... 361/679.33, 679.58, 679.39, 679.31, 752; 362/85; 439/928.1
See application file for complete search history.

(56) References Cited

U.S. PATENT DOCUMENTS

| 8,531,828 B2 * | 9/2013 | Tye | G06F 1/187 361/679.33 |
| 9,052,878 B2 * | 6/2015 | Lo | G06F 1/187 |

* cited by examiner

*Primary Examiner* — Mandeep S Buttar
(74) *Attorney, Agent, or Firm* — ScienBiziP, P.C.

(57) ABSTRACT

A mounting apparatus for mounting a hard disk drive which does not require screws or tools includes bracket and latching unit. The bracket includes a bottom plate and parallel side plates. The several latching units are rotatably connected to a lower side of the side plate, a free end of the latching unit defines a latching portion. The side plate defines a latching slot corresponding to the latching portion, and when the latching unit is rotated to abut the side plate, the latching portion is latched in the latching slot and holds a hard disk drive strongly and stably in an receiving space defined by the bottom plate and the side plates. The electronic device is further disclosed.

18 Claims, 3 Drawing Sheets

MOUNTING APPARATUS FOR HARD DISK DRIVE AND ELECTRONIC DEVICE USING THE SAME

FIELD

The subject matter herein generally relates to mounting apparatus for hard disk drive and electronic devices using the mounting apparatus.

BACKGROUND

The HDDs of computers are mounted in a bracket of the computer. The HDD is directly inserted into the bracket, and a large number of screws extend through sidewalls of the bracket to fix the HDD to the bracket. The mounting or removal of the HDD to or from the bracket requires a tool to fasten or release the screws. Thus, the assembly and disassembly of the HDD is laborious.

BRIEF DESCRIPTION OF THE DRAWINGS

Implementations of the present technology will now be described, by way of example only, with reference to the attached figures.

DETAILED DESCRIPTION

Figure 1:
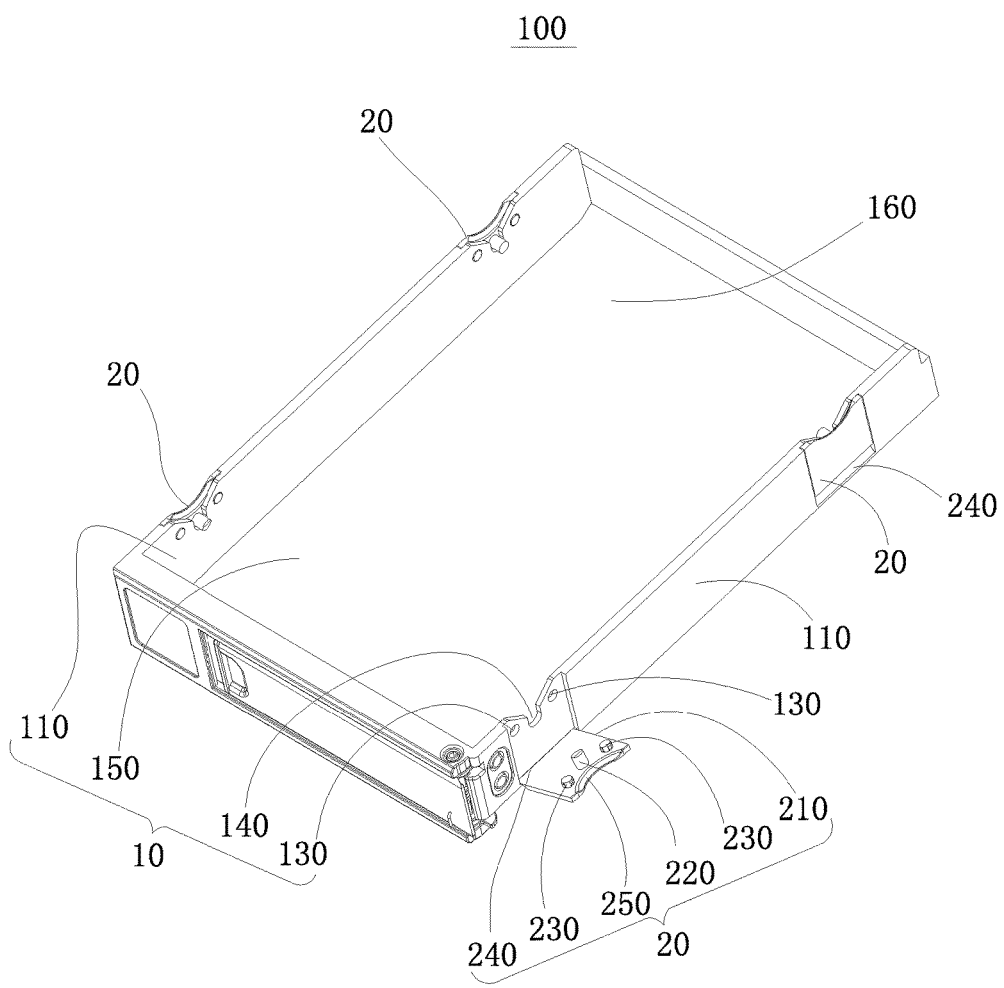
FIG. 1 is an isometric view of an exemplary embodiment of a mounting apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the exemplary embodiments described herein.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
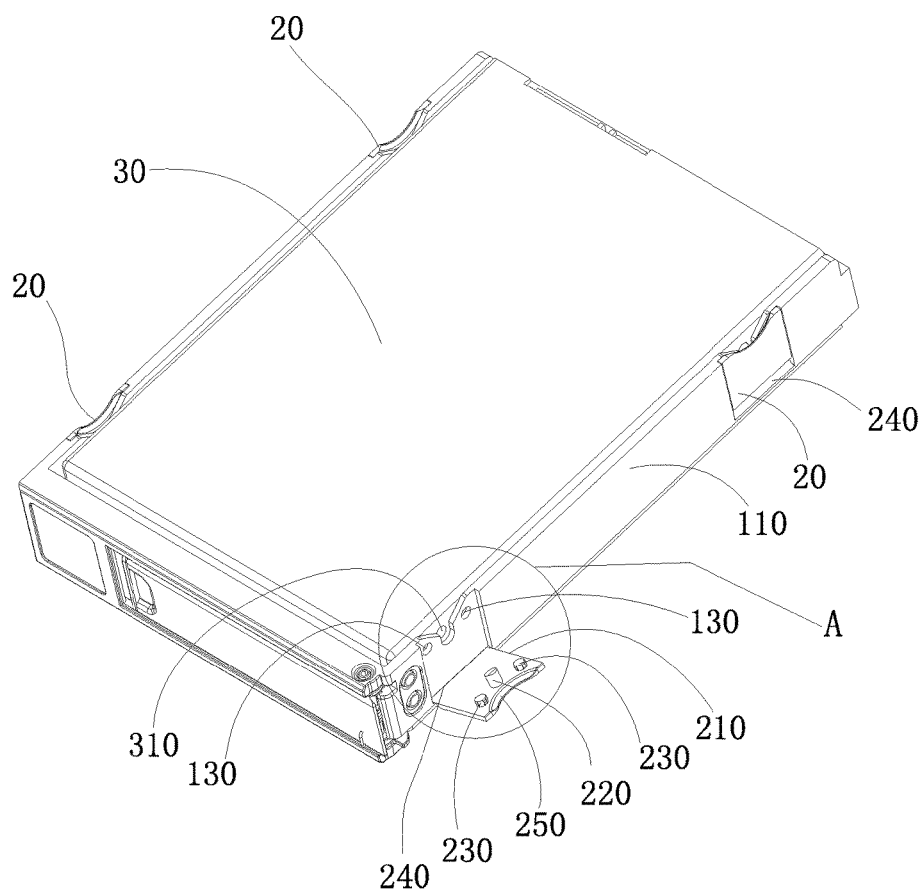
FIG. 2 is an isometric view of an exemplary embodiment of an electronic device using the mounting apparatus of FIG. 1.
Figure 3:
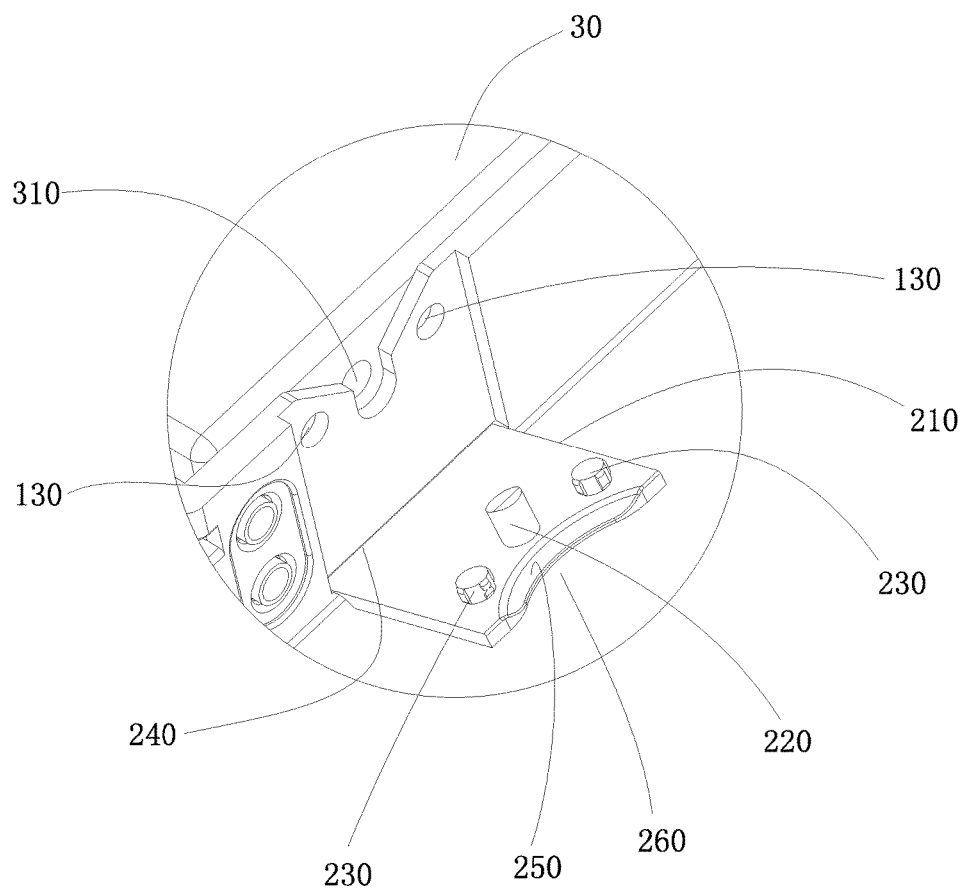
FIG. 3 is a partially enlarged view of A section of FIG. 2.

FIGS. 1 to 3 illustrate an electronic device 200 in an exemplary embodiment. The electronic device 200 can include a mounting apparatus 100 and a hard disk drive 30. The hard disk drive 30 can be installed to the mounting apparatus 100 and detached from the mounting apparatus 100 in a way that does not require tools or screws.

The mounting apparatus 100 can include a bracket 10 and at least one latching unit 20.

The bracket 10 can include a bottom plate 150 and two side plates 110. The two side plates 110 are parallel to each other and perpendicularly connected to two the parallel sides of the bottom plate 150, so that the bottom plate 150 and the two side plates 110 can define a receiving space 160 (see FIG. 1). The hard disk drive 30 can be received in the receiving space 160.

An end of the latching unit 20 is rotatably connected to a lower side of the side plate 110. A free end of the latching unit 20 defines a latching portion 220. An upper side of the side plate 110 defines a latching slot 140 corresponding to the latching portion 220. When the latching unit 20 is rotated to abut the side plate 110, the latching portion 220 is latched in the latching slot 140 and the latching portion 220 resists against the hard disk drive 30 received in the receiving space 160 so that the hard disk drive 30 can be locked by the latching unit 20.

In at least one exemplary embodiment, the number of the latching units 20 can be an even number, and the latching units 20 are symmetrically distributed on two parallel side plates 110. When such latching units 20 on two parallel side plates 110 are rotated to fit the side plates 110, the hard disk drive 30 received in the receiving space 160 can be evenly secured and balanced.

When the hard disk drive 30 received in the receiving space 160 is to be detached, the free end of the latching units 20, where the latching portion 220 locates, can be pulled away from the side plate 110. The latching unit 20 rotates away from the side plate 110, and the hard disk drive 30 received in the receiving space 160 is then released and free to be detached.

In at least one exemplary embodiment, the side plate 110 can define an accommodating groove (not labeled) corresponding to the latching unit 20. When the latching unit 20 is rotated to fit the side plate 110, the latching unit 20 is accommodated in the accommodating groove, so that the latching unit 20 will take no extra space of the mounting apparatus 100.

The latching unit 20 can include a pivot part 240; the latching unit 20 is rotatably connected to a lower side of the side plate 110 through the pivot part 240. The pivot part 240 can be a component made of flexible materials. The pivot part 240 can also be a pivot pin, the accommodating groove defines a pivot hole (not shown) corresponding to the pivot pin, and the latching unit 20 is rotatably connected to a lower side of the side plate 110 through the pivot pin and the pivot hole.

In at least one exemplary embodiment, the latching unit 20 can include at least one fastener 230. The side plate 110 defines at least one fastening hole 130 corresponding to the at least one fastener 230. When the latching unit 20 is rotated up to the side plate 110, the fastener 230 is fastened in the fastening hole 130 and the latching unit 20 is then fastened to the side plate 110. The latching portion 220 is latched in the latching slot 140 and the latching portion 220 resists against the hard disk drive 30 received in the receiving space 160 so that the hard disk drive 30 can be locked by the latching unit 20.

The latching unit 20 can include a latching plate 210. The latching portion 220 is a post connected to an inner side of the latching plate 210. A side surface of the hard disk drive 30 defines a locking hole 310 to match the latching portion 220. When the latching portion 220 is latched in the latching slot 140, an end of the post is inserted into the locking hole 310 to lock the hard disk drive 30.

The fastener 230 can be a cylinder, the fastening hole 130 is a cylindrical hole corresponding to the cylinder, the cylinder, and the corresponding cylindrical hole fit closely together by an interference fit.

Each of the upper side of the side plate 110 and the upper side of the latching plate 210 defines a gap 260 (the gap on the side plate 110 is not labeled). When the latching unit 20 is rotated to abut the side plate 110, the gap 260 on the latching plate 210 aligns with the gap on the side plate 110, so that the hard disk drive 30 is partially exposed to the fingertips of a technician.

An upper side of the gap 260 on the latching plate 210 defines a shrinking portion 250. The thickness of the shrinking portion 250 decreases along a direction extending to the upper side of the gap 260, so as to form an interval between the latching plate 210 and the side plate 110. The interval can be used as operating space for rotating the latching unit 20.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A mounting apparatus for a hard disk drive comprising: a bracket comprising: a bottom plate; and at least two side plates parallel to each other and perpendicularly connected to two parallel sides of the bottom plate; and a receiving space defined by the bottom plate and the at least two side plates; and at least one latching unit rotatable connected to a lower side of one of the at least two side plates, wherein a free end of the at least one latching unit defines a latching portion; wherein an upper side of the side plate defines a latching slot corresponding to the latching portion; and when the latching unit is rotated to abut the side plate, the latching portion is latched in the latching slot and resists against a hard disk drive received in the receiving space; wherein the latching unit comprises a latching plate, and the latching portion is a post connected to an inner side of the latching plate.

2. The mounting apparatus of claim 1, wherein the side plate defines an accommodating groove corresponding to the latching unit; and when the latching unit is rotated to abut the side plate, the latching unit is accommodated in the accommodating groove.

3. The mounting apparatus of claim 1, wherein the latching unit comprises a flexible part, and the latching unit is rotatably connected to a lower side of the side plate through the flexible part.

4. The mounting apparatus of claim 2, wherein the latching unit comprises a pivot pin, the accommodating groove defines pivot holes corresponding to the pivot pin, and the latching unit is rotatably connected to a lower side of the side plate through the pivot pin and the pivot holes.

5. The mounting apparatus of claim 1, wherein the latching unit comprises at least one fastener, and the side plate defines at least one fastening hole corresponding to the at least one fastener; and when the latching unit is rotated to abut the side plate, the at least one fastener is fastened in the at least one fastening hole and the latching unit is fastened to the side plate.

6. The mounting apparatus of claim 1, wherein each of the upper side of the side plate and the upper side of the latching plate defines a gap; and when the latching unit is rotated to abut the side plate, the gap on the latching plate aligns with the gap on the side plate.

7. The mounting apparatus of claim 6, wherein an upper side of the gap on the latching plate defines a shrinking portion, and a thickness of the shrinking portion decreases along a direction extending to the upper side of the gap.

8. The mounting apparatus of claim 5, wherein each of the at least one fastener is a cylinder, the fastening hole is a cylindrical hole corresponding to the cylinder.

9. The mounting apparatus of claim 8, wherein the cylinder and a corresponding cylindrical hole fastened to each other by an interference fit.

10. An electronic device comprising: a hard disk drive; and a mounting apparatus comprising: a bracket comprising: a bottom plate; and at least two side plates parallel to each other and perpendicularly connected to two parallel sides of the bottom plate; and a receiving space defined by the bottom plate and the at least two side plates; and at least one latching unit rotatable connected to a lower side of one of the at least two side plates, wherein a free end of the at least one latching unit defines a latching portion; wherein an upper side of the side plate defines a latching slot corresponding to the latching portion; and when the latching unit is rotated to abut the side plate, the latching portion is latched in the latching slot and resists against the hard disk drive received in the receiving space; wherein the latching unit comprises a latching plate, and the latching portion is a post connected to an inner side of the latching plate.

11. The electronic device of claim 10, wherein the side plate defines an accommodating groove corresponding to the latching unit; and when the latching unit is rotated to abut the side plate, the latching unit is accommodated in the accommodating groove.

12. The electronic device of claim 10, wherein the latching unit comprises a flexible part, and the latching unit is rotatably connected to a lower side of the side plate through the flexible part.

13. The electronic device of claim 11, wherein the latching unit comprises a pivot pin, the accommodating groove defines pivot holes corresponding to the pivot pin, and the latching unit is rotatably connected to a lower side of the side plate through the pivot pin and the pivot holes.

14. The electronic device of claim 10, wherein the latching unit comprises at least one fastener, and the side plate defines at least one fastening hole corresponding to the at least one fastener; and when the latching unit is rotated to abut the side plate, the at least one fastener is fastened in the at least one fastening hole and the latching unit is fastened to the side plate.

15. The electronic device of claim 10, wherein each of the upper side of the side plate and the upper side of the latching plate defines a gap; and when the latching unit is rotated to abut the side plate, the gap on the latching plate aligns with the gap on the side plate.

16. The electronic device of claim 15, wherein an upper side of the gap on the latching plate defines a shrinking portion, and a thickness of the shrinking portion decreases along a direction extending to the upper side of the gap.

17. The electronic device of claim 14, wherein each of the at least one fastener is a cylinder, the fastening hole is a cylindrical hole corresponding to the cylinder.

18. The electronic device of claim 17, wherein the cylinder and a corresponding cylindrical hole fastened to each other by an interference fit.

* * * * *